W. C. SCHADE.
CAR WHEEL.
APPLICATION FILED MAR. 30, 1912.
1,045,893. Patented Dec. 3, 1912.
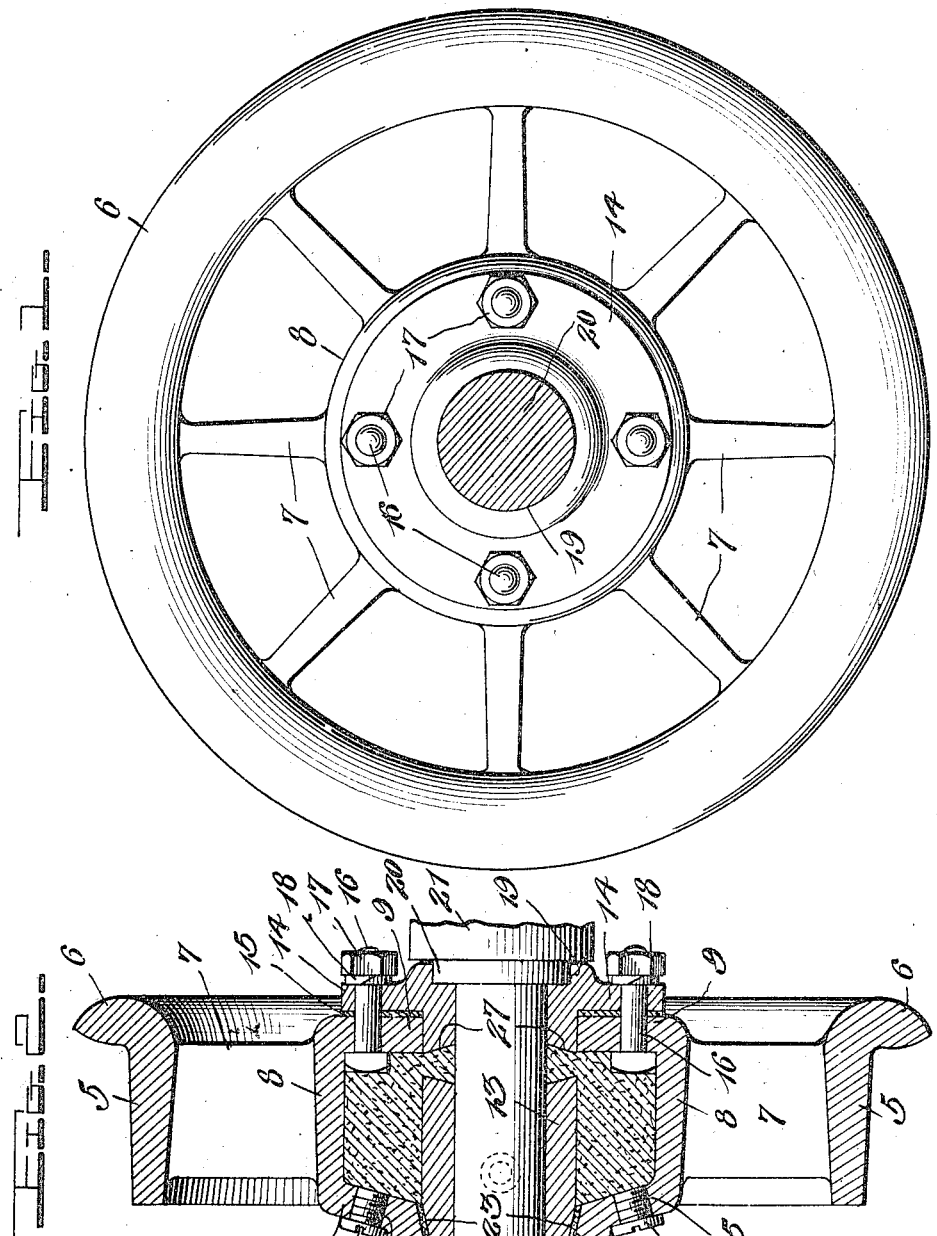
Witnesses
Chas. L. Griesbauer.
A. B. Norton.
Inventor
W. C. Schade,
By Watson E. Coleman,
Attorney

UNITED STATES PATENT OFFICE.

WILBERT C. SCHADE, OF CHERRY TREE, PENNSYLVANIA.

CAR-WHEEL.

1,045,893.

Specification of Letters Patent.  Patented Dec. 3, 1912.

Application filed March 30, 1912. Serial No. 687,471.

*To all whom it may concern:*

Be it known that I, WILBERT C. SCHADE, a citizen of the United States, residing at Cherry Tree, in the county of Indiana and State of Pennsylvania, have invented certain new and useful Improvements in Car-Wheels, of which the following is a specification, reference being had to the accompanying drawings.

This invention relates to car wheels and more particularly to a wheel which is especially designed for use upon mining cars, the primary object of the invention being to provide a wheel having a removable bushing or bearing sleeve and means to rigidly and quickly secure said removable bushing in the hub of the wheel.

A further object of the invention is to provide a wheel of the above character which is of such construction that the necessary repairs thereto may be made at a nominal cost, is extremely strong and durable in construction and may be easily and quickly applied to the wheel axle.

With the above and other objects in view, the invention consists of the novel features of construction, combination and arrangement of parts hereinafter fully described and claimed, and illustrated in the accompanying drawings, in which—

Figure 1 is a side elevation of a car wheel embodying the present invention showing the same arranged on the axle; and Fig. 2 is a longitudinal section thereof.

Referring in detail to the drawing 5 designates the rim or tread of the wheel provided with the usual flange 6. This rim is integrally connected by means of the radial spokes 7 to a hollow cylindrical hub 8. At one end this hub is provided with an annular flange 9 extending inwardly at right angles to the body wall of the hub, and at its other end the hub is provided with an outwardly inclined flange 11 which has formed on its edge the longitudinal extension 12. Within this hollow hub the removable bushing or bearing sleeve 13 is adapted to be fitted, and the inner end of this bushing is provided with an annular flange 14 to be disposed upon the outer face of the flange 9 of the wheel hub. A gasket 15 preferably of fiber is disposed between the flanges of the hub and bushing and through said flanges which are provided with openings the connecting bolts 16 are passed. The headed ends of said bolts are disposed within the hollow hub 8 while upon the outer ends thereof the nuts 17 are threaded. Between these nuts and the flange 8' of the bushing the split locking washers 18 are arranged. The bushing 13 is also provided upon its inner end with an annular shoulder 19 forming a recess in the end of the bushing to receive the collar 20 forged upon the reduced end portion of the wheel axle 21. The axle 21 is provided with a common split cotter pin 22 against which the outer edge of the flange 11 and the outer end of the removable bushing 13 abut. This outer end of the bushing has its outer periphery beveled or inclined as shown at 23, the circular edge wall of the flange 11 being similarly inclined. A rubber gasket 24 is disposed between these inclined surfaces. It will thus be seen that when the nuts 17 are tightened on the ends of the bolts 16 the bushing 13 will be forced longitudinally through the hub 8 and the gasket 24 compressed between the flange 11 and the beveled surface of the hub thereby creating sufficient friction to retain the outer end of the bushing tightly within the outer end wall of the hub 8. The outer end wall or flange 11 of the hub of the wheel is provided with openings 25 which may be closed by means of suitable threaded plugs or oil cups 26. Through these openings the chamber between the body wall of the hub and the periphery of the removable bushing 13 may be filled with a suitable lubricant which finds its way through a plurality of openings 27 in the bushing 13, and into contact with the periphery of the wheel axle.

From the foregoing description it is believed that the construction and manner of assembling the various parts of my improved wheel will be clearly understood. When the bushing 13 becomes greatly worn, the same may be easily and quickly removed and replaced by another, thus saving the cost of a new wheel, the tread being deeply chilled, preventing wear at that point. By providing the hollow hub for the wheel, the device as a whole is rendered very light, while at the same time the rigidity and strength of the wheel is not impaired. Car wheels having replaceable bushings, as heretofore designed have required that the parts be provided with machined surfaces in order that they may properly fit together to render the hub of the wheel proof against oil leakage. By means of my improved wheel construction above described, no additional machining other than that given to the ordinary one-piece car wheel which consists in boring out the hub to fit a specified size of axle, is necessary. Thus the cost of production of the wheel is reduced to a minimum.

While I have shown and described the preferred construction and arrangement of the various parts, it will be understood that the invention is susceptible of considerable modification without departing from the essential feature or sacrificing any of the advantages thereof.

Having thus described the invention what is claimed is:—

The hereindescribed wheel having a hollow hub including an annular body wall and end walls of substantially the same thickness, one of said end walls being outwardly inclined, said end walls being provided with openings, the opening of the inclined end wall having a beveled face, a removable bushing adapted to be disposed through the openings in the end walls of the hub, the periphery of said bushing at one end being beveled to correspond with the beveled face of the opening in the inclined end wall of the hub, a compressible gasket arranged between said beveled faces, said bushing fitting closely within the opening in the other end wall of the hub, a flange formed on the bushing, and a plurality of fastening bolts disposed through openings in said flange, and coinciding openings in the last referred to end wall of the hub to rigidly secure the bushing in said hub.

In testimony whereof I hereunto affix my signature in the presence of two witnesses.

WILBERT C. SCHADE.

Witnesses:
J. E. McCORMICK,
GEO. E. M